(12) United States Patent
Artinian et al.

(10) Patent No.: US 11,828,144 B2
(45) Date of Patent: Nov. 28, 2023

(54) ISOLATING A DOWNHOLE-TYPE ELECTRIC MACHINE

(71) Applicant: Upwing Energy, Inc., Cerritos, CA (US)

(72) Inventors: Herman Artinian, Huntington Beach, CA (US); Patrick McMullen, Villa Park, CA (US)

(73) Assignee: Upwing Energy, Inc., Cerritos, CA (US)

( * ) Notice: Subject to any disclaimer, the term of this patent is extended or adjusted under 35 U.S.C. 154(b) by 84 days.

(21) Appl. No.: 17/365,825

(22) Filed: Jul. 1, 2021

(65) Prior Publication Data
US 2022/0003089 A1 Jan. 6, 2022

Related U.S. Application Data

(60) Provisional application No. 63/047,650, filed on Jul. 2, 2020.

(51) Int. Cl.
| | |
|---|---|
| *E21B 4/04* | (2006.01) |
| *E21B 43/12* | (2006.01) |
| *F04D 13/10* | (2006.01) |
| *H02K 5/132* | (2006.01) |
| *H02K 9/19* | (2006.01) |
| *H02K 7/08* | (2006.01) |

(Continued)

(52) U.S. Cl.
CPC .......... *E21B 43/128* (2013.01); *F04D 13/10* (2013.01); *H02K 5/132* (2013.01); *H02K 7/083* (2013.01); *H02K 7/09* (2013.01); *H02K 9/19* (2013.01); *F04D 29/048* (2013.01)

(58) Field of Classification Search
CPC .......... E21B 4/04; E21B 43/128; F04D 13/10; F04D 29/048; H02K 5/132
See application file for complete search history.

(56) References Cited

U.S. PATENT DOCUMENTS

| | | | | |
|---|---|---|---|---|
| 2,011,341 A | * | 8/1935 | Mendenhall | H02K 5/132 |
| | | | | 277/423 |
| 4,184,545 A | | 1/1980 | Claycomb | |
| 4,329,127 A | | 5/1982 | Tschirky et al. | |

(Continued)

FOREIGN PATENT DOCUMENTS

| | | |
|---|---|---|
| EP | 1632636 | 3/2006 |
| GB | 2501352 | 11/2017 |
| WO | WO 96/05646 | 2/1996 |

OTHER PUBLICATIONS

PCT International Search Report and Written Opinion in International Appln. No. PCT/US2021/040311, dated Oct. 29, 2021, 16 pages.

(Continued)

*Primary Examiner* — Cathleen R Hutchins
(74) *Attorney, Agent, or Firm* — Fish & Richardson P.C.

(57) ABSTRACT

An electric stator surrounds an electric rotor. A magnetic coupling is attached to an end of the electric rotor. The magnetic coupling is configured to transmit rotational force to or from a separate rotational device. A housing surrounds and isolates the electrical rotor, the electric stator, and a portion of the magnetic coupling, from a wellbore fluid. The housing is flooded with an incompressible fluid. A pressure within the housing is substantially the same or lower than a pressure within a wellbore environment.

26 Claims, 6 Drawing Sheets

(51) Int. Cl.
*H02K 7/09* (2006.01)
*F04D 29/048* (2006.01)

(56) References Cited

U.S. PATENT DOCUMENTS

| | | | |
|---|---|---|---|
| 5,265,682 | A | 11/1993 | Russell et al. |
| 5,912,519 | A | 6/1999 | Horner |
| 6,250,806 | B1 | 6/2001 | Beshoory |
| 6,439,866 | B1 | 8/2002 | Farkas et al. |
| 6,557,642 | B2 | 5/2003 | Head |
| 7,327,634 | B2 | 2/2008 | Perry et al. |
| 7,407,020 | B2 | 8/2008 | Gleitman et al. |
| 7,504,752 | B2 | 3/2009 | Head |
| 8,487,493 | B2 | 7/2013 | Cunningham et al. |
| 8,944,185 | B2 | 2/2015 | Scholz et al. |
| 9,303,454 | B2 | 4/2016 | Scholz et al. |
| 9,601,964 | B2 | 3/2017 | Cunningham et al. |
| 10,337,557 | B1 | 7/2019 | McMullen |
| 10,428,822 | B1 | 10/2019 | Wang et al. |
| 10,612,351 | B2 | 4/2020 | McMullen et al. |
| 10,890,056 | B2 | 1/2021 | Biddick et al. |
| 2003/0132003 | A1 | 7/2003 | Arauz et al. |
| 2006/0048957 | A1 | 3/2006 | Oksman |
| 2007/0277969 | A1 | 12/2007 | Hall et al. |
| 2015/0114632 | A1 | 4/2015 | Romer et al. |
| 2015/0316072 | A1 | 11/2015 | Cunningham et al. |
| 2015/0322756 | A1 | 11/2015 | Cunningham et al. |
| 2015/0326094 | A1 | 11/2015 | Cunningham et al. |
| 2016/0123123 | A1 | 5/2016 | Maclean |
| 2016/0333677 | A1* | 11/2016 | Westberg ............... F04D 13/086 |
| 2017/0264158 | A1 | 9/2017 | Li et al. |
| 2018/0171767 | A1 | 6/2018 | Huynh et al. |
| 2018/0179860 | A1* | 6/2018 | McMullen ............... H02P 29/40 |
| 2018/0180049 | A1* | 6/2018 | McMullen ............ F04D 13/024 |
| 2018/0183377 | A1 | 6/2018 | McMullen et al. |
| 2019/0085671 | A1 | 3/2019 | Biddick et al. |

OTHER PUBLICATIONS

PCT International Search Report and Written Opinion in International Appln. No. PCT/US2018/067221, dated Mar. 13, 2019, 12 pages.

* cited by examiner

ISOLATING A DOWNHOLE-TYPE ELECTRIC MACHINE

CLAIM OF PRIORITY

This application claims priority under 35 USC § 119(e) to U.S. patent application Ser. No. 63/047,650, filed on 2 Jul. 2020, the entire contents of which are hereby incorporated by reference.

TECHNICAL FIELD

This disclosure relates to hermitically sealed electric machines.

BACKGROUND

Most wells behave characteristically different over time, as well as seasonally, due to geophysical, physical, and chemical changes in the subterranean reservoir that feeds the well. For example, it is common for well production to decline as the well reaches the end of its life. This decline in production is due to declining pressures in the reservoir, and can eventually reach a point where there is not enough pressure in the reservoir to push production through the well to the surface. In some wells, a top side compressor or pump is sometimes used to extend the life of the well by decreasing pressure at the top of the well. In some instances, an artificial lift system, such as an electric submersible pump, can be installed within the wellbore to a similar effect. This decrease in pressure decreases the pressure head on the production flow to the surface, enabling the well to continue producing when the reservoir pressures have dropped too low to drive the production to the surface.

SUMMARY

This disclosure describes technologies relating to isolating downhole-type electric machines which can be used to power, for example, an electric submersible pump or compressor.

An example implementation of the subject matter described within this disclosure is a downhole-type electric machine with the following features. An electric stator surrounds an electric rotor. A magnetic coupling is attached to an end of the electric rotor. The magnetic coupling is configured to transmit rotational force to or from a separate rotational device. A housing surrounds and isolates the electrical rotor, the electric stator, and a portion of the magnetic coupling, from a wellbore fluid. The housing is flooded with an incompressible fluid. A pressure within the housing is substantially the same or lower than a pressure within a wellbore environment.

Aspects of the example downhole-type electric machine, which can be combined with the downhole-type electric machine alone or in part, include the following. The fluid in the housing lubricates bearings radially and axially supporting the electric rotor within the electric stator.

Aspects of the example downhole-type electric machine, which can be combined with the downhole-type electric machine alone or in part, include the following. A seal seals the port against ingress of fluid into the housing. The seal is movable by the well fluid to apply a pressure on the incompressible fluid to equalize pressure between the incompressible fluid and the well fluid.

Aspects of the example downhole-type electric machine, which can be combined with the downhole-type electric machine alone or in part, include the following. A seal seals the port against ingress of fluid into the housing. The fluid in the housing cools the electric stator and bearings located within the housing.

Aspects of the example downhole-type electric machine, which can be combined with the downhole-type electric machine alone or in part, include the following. A seal seals the port against ingress of fluid into the housing. The electric rotor includes a permanent magnet rotor.

Aspects of the example downhole-type electric machine, which can be combined with the downhole-type electric machine alone or in part, include the following. The magnetic coupling includes a radial gap type coupling or an axial gap type coupling.

Aspects of the example downhole-type electric machine, which can be combined with the downhole-type electric machine alone or in part, include the following. A magnetic or mechanical radial bearing is configured to radially support the electric rotor within the electric stator.

Aspects of the example downhole-type electric machine, which can be combined with the downhole-type electric machine alone or in part, include the following. The magnetic radial bearing is a passive magnetic radial bearing.

Aspects of the example downhole-type electric machine, which can be combined with the downhole-type electric machine alone or in part, include the following. A magnetic or mechanical thrust-bearing is configured to axially support the electric rotor within the electric stator.

Aspects of the example downhole-type electric machine, which can be combined with the downhole-type electric machine alone or in part, include the following. The magnetic thrust-bearing includes an active magnetic thrust-bearing.

An example implementation of the subject matter described within this disclosure includes a method with the following features. An electric machine is housed within a fluid flooded and sealed housing fluidically isolated from an outside environment. The housing has an internal isolated environment having substantially equivalent to or lower pressure than the outside environment. A rotational force is imparted to or from a rotor rotating within the isolated environment, within the electric machine, via a magnetic coupling located at an end of the rotor.

Aspects of the example method, which can be combined with the example method alone or in part, include the following. Bearings are lubricated by the fluid. The electric machine is cooled by the fluid.

Aspects of the example method, which can be combined with the example method alone or in part, include the following. An axial position of the rotor is actively maintained within an electric stator with a magnetic thrust-bearing.

Aspects of the example method, which can be combined with the example method alone or in part, include the following. A radial position of the rotor is actively maintained within an electric stator with a magnetic radial bearing.

Aspects of the example method, which can be combined with the example method alone or in part, include the following. A radial position of the rotor is maintained within an electric stator with a mechanical radial bearing.

Aspects of the example method, which can be combined with the example method alone or in part, include the following. An axial and radial position of the rotor is maintained within an electric stator with a mechanical ball bearing.

Aspects of the example method, which can be combined with the example method alone or in part, include the following. The rotor includes a permanent magnet rotor.

Aspects of the example method, which can be combined with the example method alone or in part, include the following. The housing is constructed of a non-magnetic metal alloy.

Aspects of the example method, which can be combined with the example method alone or in part, include the following. The housing is constructed of a non-magnetic, non-electrically conductive material.

An example implementation of the subject matter described within this disclosure is a downhole-type electric machine system with the following features. An electric rotor is configured to rotate or be rotated by a separate rotational device. An electric stator is configured to surround the electric rotor. A magnetic coupling is configured to transmit rotational force to or from the separate rotational device. A housing is configured to fluidically isolate the electrical rotor, the electric stator, and a portion of the magnetic coupling from a wellbore fluid. A pressure within the housing is lower than or substantially equivalent to a pressure within a wellbore environment. A dielectric fluid is located within the housing. A controller is configured to exchange an electric current to or from the electric stator.

Aspects of the example downhole-type electric machine system, which can be combined with the example downhole-type electric machine system alone or in part, include the following. The controller is configured to be positioned outside of a wellbore.

Aspects of the example downhole-type electric machine system, which can be combined with the example downhole-type electric machine system alone or in part, include the following. The system further includes electrical cables connecting the controller and the electric stator. The housing includes penetration points for the electrical cables. The penetration points are configured to maintain the pressure within the housing.

Aspects of the example downhole-type electric machine system, which can be combined with the example downhole-type electric machine system alone or in part, include the following. The penetration points are part of a connector are located at a downhole end of the housing.

Aspects of the example downhole-type electric machine system, which can be combined with the example downhole-type electric machine system alone or in part, include the following. An active magnetic thrust-bearing is configured to axially support the electric rotor within the electric stator.

Aspects of the example downhole-type electric machine system, which can be combined with the example downhole-type electric machine system alone or in part, include the following. The controller is further configured to control the active magnetic bearing.

Aspects of the example downhole-type electric machine system, which can be combined with the example downhole-type electric machine system alone or in part, include the following. A magnetic radial bearing is configured to radially support the electric rotor within the electric stator.

Aspects of the example downhole-type electric machine system, which can be combined with the example downhole-type electric machine system alone or in part, include the following. The magnetic radial bearing comprises an active magnetic radial bearing.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

While producing well fluids from a wellbore with an artificial lift system, such as an electric submersible pump, parts of the artificial lift system are exposed to contaminants that can cause damage to the artificial lift system. Often times bearings and other vulnerable components are protected with seals, but seals wear overtime and only delay contamination of the vital components.

This disclosure describes a completely isolated, hermitically sealed, high-speed downhole-type electric machine that is designed to protect the electric machine components from downhole contaminants. In the context of this disclosure, "high-speed" is used to mean greater than 3,600 revolutions per minute. The high-speed downhole-type electric machine includes a housing that fluidically isolates an electric rotor, an electric stator, and bearings from a downhole environment. A pressure within the housing is substantially similar to (within 10% or the absolute pressure of the environment) or below that of the downhole environment. A rotational force is transmitted to or from the electric rotor by a magnetic coupling that is capable of transferring force magnetically through an isolation barrier.

Particular implementations of the subject matter described in this disclosure can be implemented so as to realize one or more of the following advantages. The high-speed downhole-type electric machine will be isolated from possible contaminants that could lead to a shortened operational lifespan. In addition, having a liquid within the housing allows for lubrication of mechanical bearings being used for radial and axial support, transfer of heat from the motor stator, rotor, and bearings to the housing to be transferred by to the production fluid flow outside the housing, and lowers mechanical support requirements necessary when large pressure differential is present between the inside and outside of the housing. Higher speed can also result in a smaller, lighter electric machine to do the equivalent amount of work, as higher speed increases the output horsepower for a given torque rating of the machine to drive a fluid pump. In other words, the same machine size can provide more work with high speed.

Figure 1A:
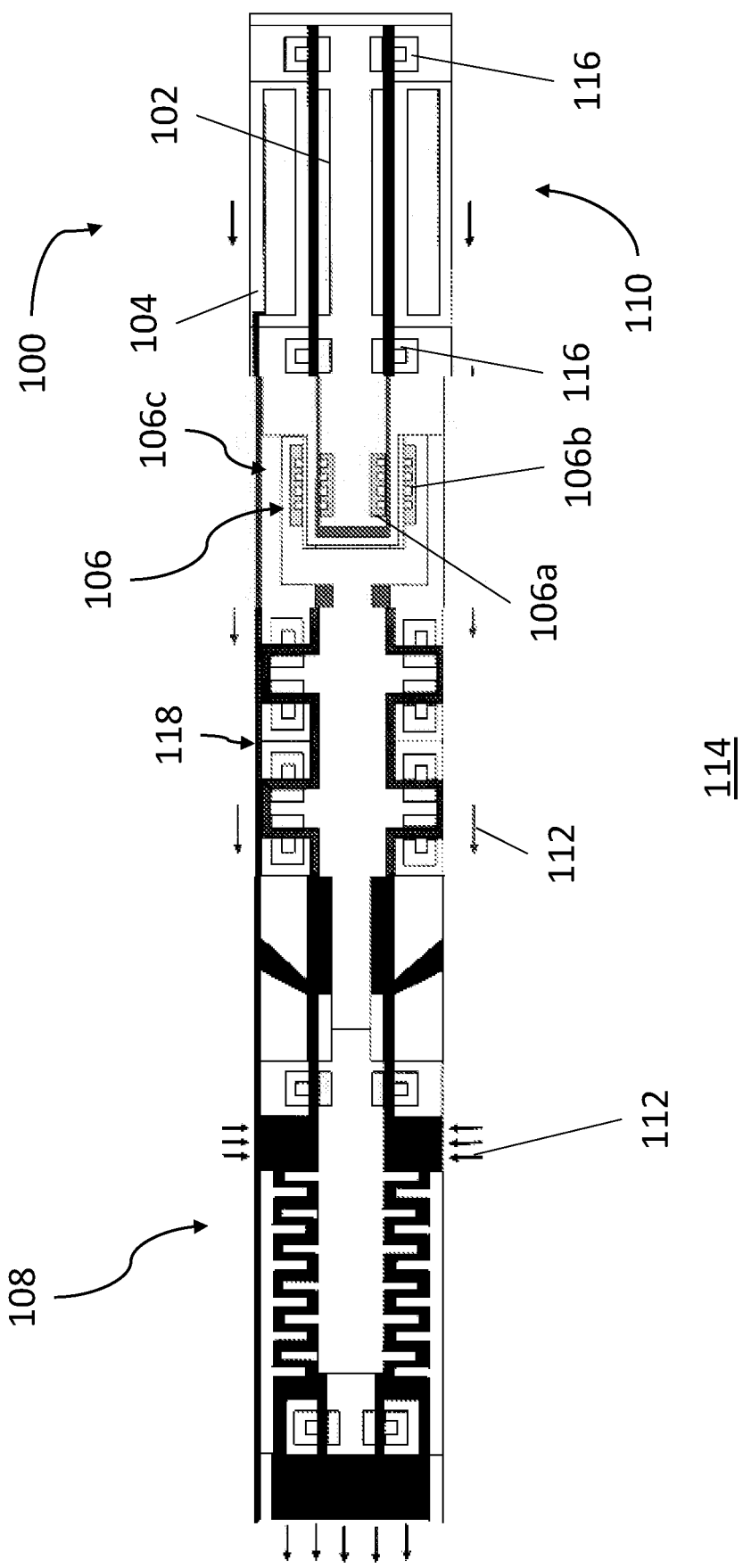
FIG. 1A is a side half cross-sectional view of an example downhole-type artificial lift system.

FIG. 1A shows an example half cross-sectional view of an example high-speed down-hole type electric machine 100 and fluid end 108. The example high-speed down-hole type electric machine 100 includes an electric rotor 102 surrounded by an electric stator 104. The electric rotor 102 is configured to rotate or be rotated by a separate rotational device, such as the fluid end 108. The electric rotor 102 can include a permanent magnet rotor, an inductive rotor, or any other type of electric rotor. A magnetic coupling 106 is attached to an end of the electric rotor 102. The magnetic coupling 106 is configured to transmit rotational force to or from the separate rotational device.

A housing 110 surrounds and isolates the electrical rotor 102, the electric stator 104, and the magnetic coupling 106 from a wellbore fluid 112. A pressure within the housing is substantially the same as or lower than a pressure within a wellbore environment 114. In some implementations, the housing 110 is constructed of a non-magnetic metal alloy. In some instances, the housing 110 is constructed of a non-magnetic material, a non-electrically conductive material, or both.

The electric machine includes one or more radial bearings 116. The radial bearing 116 radially supports the electric rotor 102 within the electric stator 104. In the illustrated implementation, the radial bearing 116 includes a magnetic radial bearing configured to radially support the electric rotor 102 within the electric stator 104. Alternatively, a mechanical bearing, such as a fluid film bearing or an anti-friction bearing, can also be used to support the electric rotor 102. When a magnetic radial bearing is used, the magnetic radial bearing can be a passive magnetic radial bearing or an active magnetic radial bearing. Detailed examples of passive magnetic radial bearings are discussed later within this disclosure. An anti-friction bearing can include a mechanical ball bearing configured to radially and axially support the electric rotor within the electric stator. In such instances, the fluid in the isolated housing is used to lubricate the bearings and conduct heat from the electric machine rotor and stator to the housing to be transferred to the working fluid surrounding the housing.

The high-speed down-hole type electric machine 100 also includes a thrust-bearing 118 configured to axially support the fluid end 108 within the electric stator 104. As illustrated in FIG. 1A, the thrust-bearing 118 is a magnetic thrust-bearing. While a magnetic thrust-bearing is illustrated in FIG. 1A, a mechanical thrust-bearing can also be used without departing from the scope of this disclosure. In implementations in which a magnetic thrust-bearing is used, the magnetic thrust-bearing can include an active magnetic thrust-bearing. Details on an example magnetic thrust-bearing are discussed later in this disclosure.

In order to maintain an isolation for the housing 110, a magnetic coupling 106 is used to couple the electric machine 100 to the fluid end 108. The magnetic coupling 106 is configured to transmit rotational force to or from a separate rotational device, such as the fluid end 108. In other words, a rotational force is imparted to or from a rotor rotating within the electric machine via the magnetic coupling 106 located at an end of the rotor. As illustrated in FIG. 1A, the magnetic coupling 106 includes a radial gap type coupling. The radial gap type coupling includes an inner rotor 106a that is contained within the sealed housing 110, and a surrounding sleeve 106b that is configured to radially surround the inner rotor 106a. The inner rotor 106a, the surrounding sleeve 106b, or both, include one or more coupling magnets 106c that generate a coupling magnetic field between the inner rotor 106a and the outer rotor 106b. In some implementations, the inner rotor 106a includes permanent magnets. In some implementations, the inner rotor 106a or outer rotor 106b include metal poles that interact with the permanent magnets. While inner rotor 106a is shown within the isolated housing, in some instances, the outer rotor 106b can be included in the isolated environment. In some implementations, the coupling magnets 106c can include electromagnets.

Figure 1B:
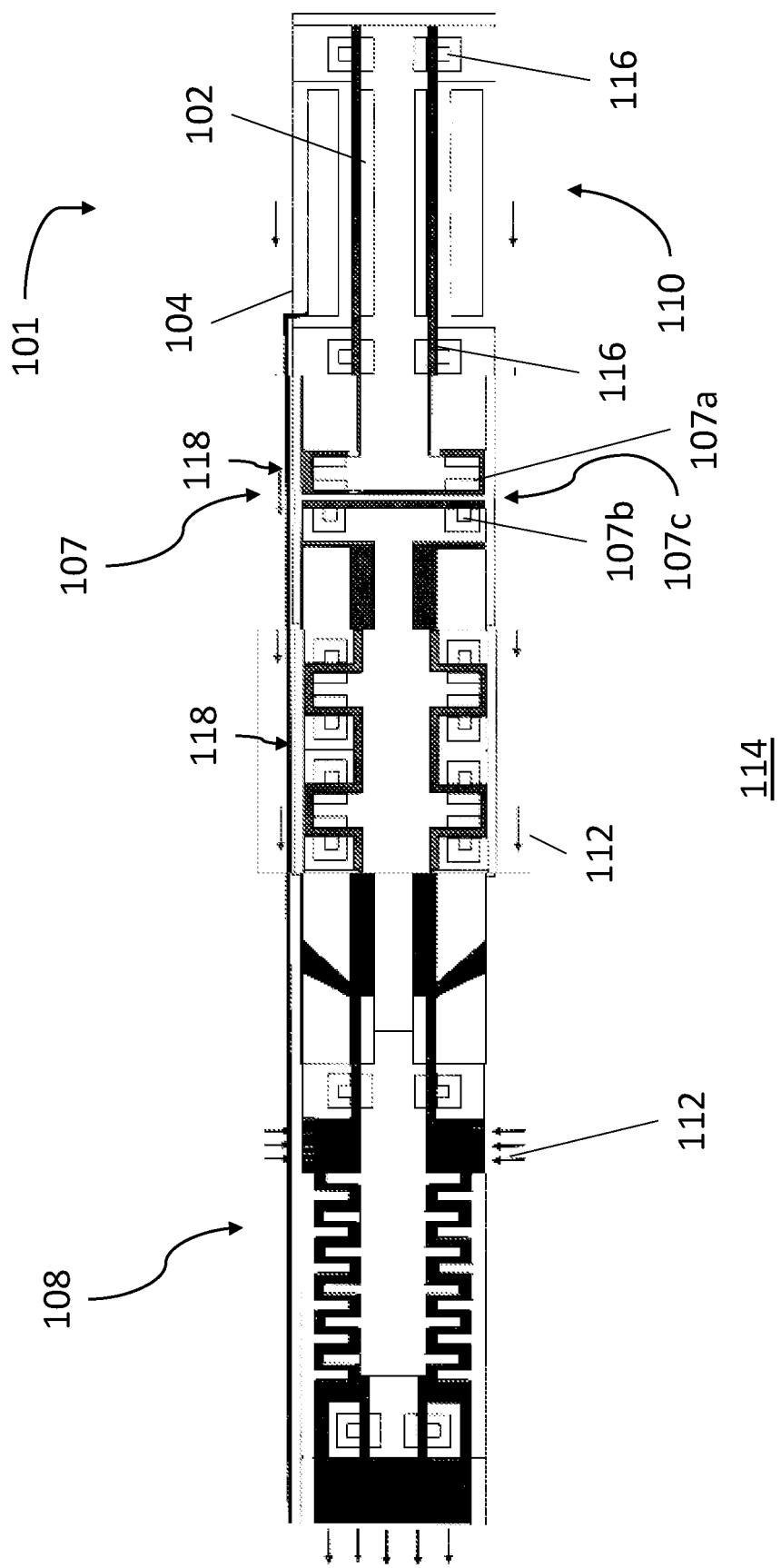
FIG. 1B is a side half cross-sectional view of an example downhole-type artificial lift system.

FIG. 1B shows a side half cross-sectional view of an example high-speed downhole-type electric machine 101 and fluid end 108. The high-speed downhole-type electric machine 200 is substantially similar to the high-speed downhole type electric machine 100 with the exception of the magnetic coupling 107. In the illustrated implementation, the magnetic coupling 107 is an axial gap type coupling. The axial gap type coupling includes a first rotor plate 107a that is contained within the sealed housing 110 and a second rotor plate 107b that is configured to be axially aligned with and be axially spaced to be in close proximity to the first rotor plate 107a. In the context of this disclosure, close proximity is defined as proximity sufficient for magnetic coupling to occur. That is, a gap between the first rotor plate 107a and the second rotor plate 107b is small enough to allow torque transfer from the first rotor plate 107a to the second rotor plate 107b or vice versa. The first rotor plate 107a, the second rotor plate 107b, or both, include one or more coupling magnets 107c that generate a coupling magnetic field between the first rotor plate 107a and the second rotor plate 107b. In some implementations, the first rotor plate 107a includes permanent magnets. In some implementations, the coupling magnets 107c can include electromagnets. In some implementations, the axial gap magnetic coupling can transfer a thrust load. In such an implementation, the electric machine 100 can be axially supported by the thrust-bearing 118 housed within housing.

Figure 2:
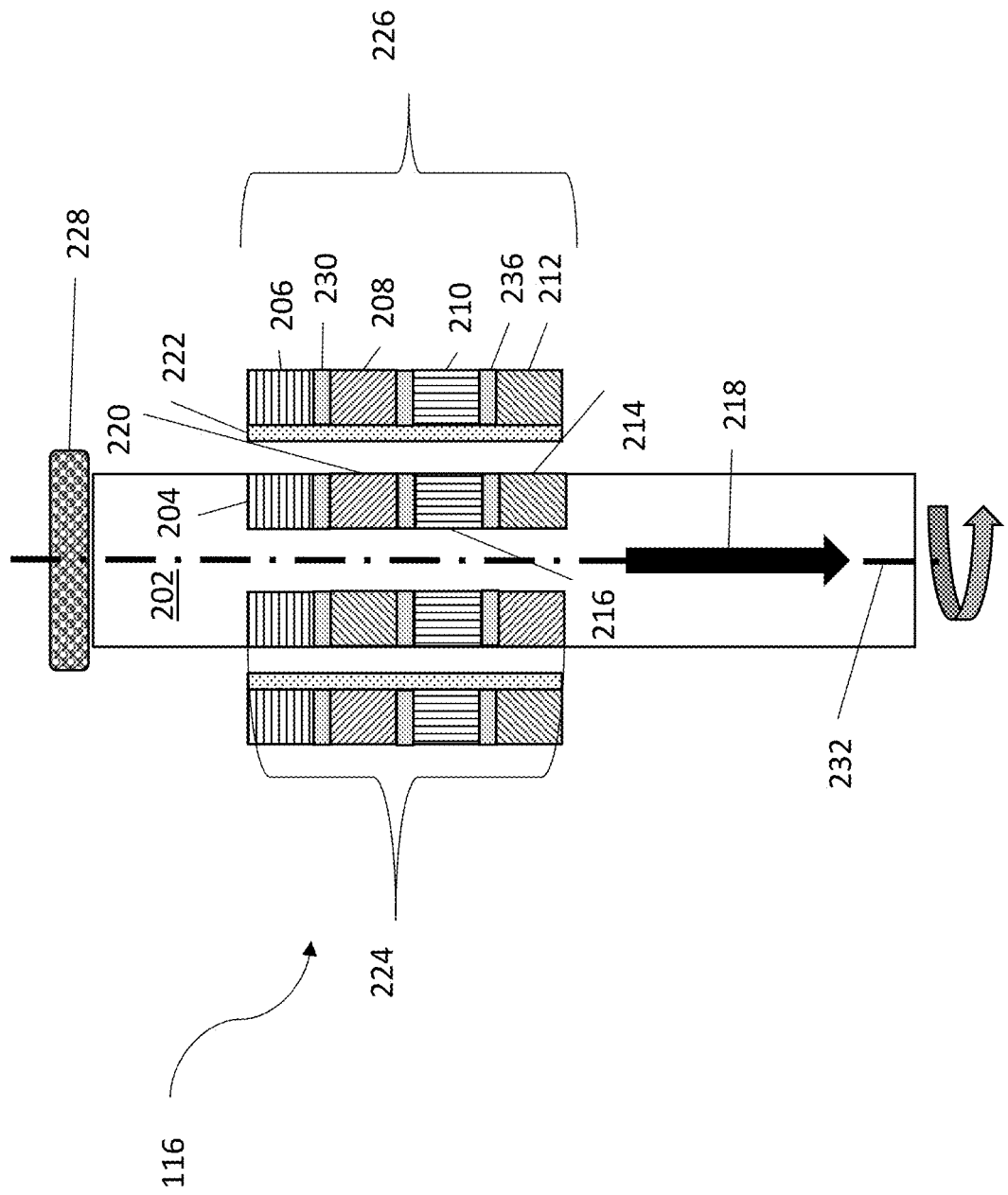
FIG. 2 is a side half cross-sectional diagram of an example passive magnetic radial bearing.

An example passive radial magnetic radial bearing 116 is shown in greater detail in FIG. 2. The passive magnetic bearing 116 includes a bearing shaft 202. The bearing shaft 202 can be included within either the fluid end 108 or the electric rotor 102. The bearing shaft 202 is made of a non-magnetic material and includes a shaft magnet assembly 224 which includes individual axially-magnetized magnets (204, 220, 216, and 214 in this example) that are radially imbedded into the bearing shaft 202 and each separated by a non-magnetic or magnetic spacer 236. In some implementations, the exterior surface of the shaft magnet assembly 224 is substantially flush with the outer surface of the bearing shaft 202 within standard machining tolerances. The shaft magnet assembly 224 can be connected to the shaft by adhesive, slot fits, ring fits, an external sleeve, or any other manners of connection. The individual magnets within the shaft magnet assembly 224 can be arranged so that the magnet polarities alternate along the shaft axis. For example, a first shaft magnet 204 may have a north pole towards a downhole direction, a second shaft magnet 220 may have a north pole towards an uphole direction, a third shaft magnet 216 may have a north pole towards a downhole direction, and a fourth shaft magnet 214 may have a north pole towards an uphole direction. In some implementations, the individual magnets within the shaft magnet assembly 224, such as the first shaft magnet 204, the second shaft magnet 220, the third shaft magnet 216, and the fourth shaft magnet 214 shown in FIG. 2, may each be composed of multiple smaller magnets of similar polarities. In some implementations, the individual magnets within the shaft magnet assembly 224, such as the first shaft magnet 204, the second shaft magnet 220, the third shaft magnet 216, and the fourth shaft magnet 214 shown in FIG. 2, are each radially magnetized. For example, the first shaft magnet 204 may have a north pole towards a radially outward direction, the second shaft magnet 220 may have a north pole towards a radially inward direction, the third shaft magnet 216 may have a north pole towards a radially outward direction, and the fourth shaft magnet 214 may have a north pole towards a radially inward direction.

The illustrated passive magnetic bearing 116 also includes a stator magnet assembly 226. The stator magnet assembly 226 can be installed in a magnetic or non-magnetic housing or holder and connected to either the fluid end 108 or the electric stator 104 and surround the bearing shaft 202. Each of the magnets in stator magnet assembly 226, such as magnets 206, 208, 210, and 212 in the example shown in FIG. 2, are separated by the non-magnetic, electrically-conductive, spacers 230. The spacer 230 can act as a generator to generate eddy currents when an induced magnetic field changes as a result of a relative motion between the electric rotor 102 and the stator magnet assembly 226. The eddy currents act to oppose the change in the magnetic field and create a passive damping of a rotor radial vibration. The magnets within the shaft magnet assembly 224 and the stator magnet assembly 226 can be arranged so that that the identical poles of the individual magnets inside the shaft magnet assembly 224 and the stator magnet assembly 226 are substantially in line with one another. For example, a first stator magnet 206 may have the same polarity as the first shaft magnet 204, a second stator magnet 208 may have the same polarity as the second shaft magnet 220, a third stator magnet 210 may have the same polarity as the third shaft magnet 216, and a fourth stator magnet 212 may have the same polarity as the fourth shaft magnet 214. In some implementations, the individual stator magnets can be made-up of multiple smaller magnets having a similar polarity. Having magnets of similar polarities in proximity to one another creates a repulsion force that keeps the bearing shaft 202 radially suspended within the stator magnet assembly 226. While the shaft 202 is suspended, the shaft 202 can have a rotation about a longitudinal axis 232 that is not reduced by a surface-to-surface friction.

In some instances, the multiple shaft magnets and multiple stator magnets can be arranged in such a way as to create an axial force 218, which could be directed either towards a thrust-bearing, resulting in an additional thrust pre-load, or away from the thrust-bearing, offsetting the weight of the rotor and therefore reducing the axial load on the thrust-bearing, and, consequently, increasing its service life if a mechanical thrust-bearing is used. This can be done by an axial offset in position of rotor magnets 204, 220, 216, and 214 to stator magnets 206, 208, 210, and 212 by less than a half of the axial magnet width. If the rotor magnets are shifted upwards with respect to the stator magnet, the axial force will be directed upwards and vice-versa. Even with the axial force 218 directed towards the thrust-bearing 118, a reversal of the axial thrust is possible during events such as transportation, start-up, or shut-down. Such a thrust reversal can be mitigated by a bumper 228 positioned at an end of the shaft 202 opposite of the direction of thrust load 218. In some implementations, an inner protective can 222 made out of a non-magnetic alloy can be installed to cover the inner diameter of the stator magnet assembly 226, protecting its components from mechanical damage. In some implementations, an inner protective can 222, made out of a non-magnetic electrically conductive alloy, is installed to cover the inner diameter of the stator magnet assembly 226. In such implementations, the protective can generates eddy currents when an induced magnetic field changes responsive to a relative motion between the electric rotor 102 and the stator magnet assembly 226. The eddy currents act to oppose the change in the magnetic field and create a passive damping of a rotor radial vibration. In some implementations, disk-shaped end pieces 234 can be added to the ends of the shaft magnet assembly 224, primarily to protect the free faces of the magnets within this assembly. The end pieces 234 can be made identical to the shaft magnet spacers 236. In some implementations, a sleeve made of a non-magnetic high strength alloy can be installed to cover the outer diameter of the shaft magnet assembly 224 and the end pieces 234 to secure relative position of its components during high speed operation, protect them from damage, and seal them from the environment. While passive magnetic radial bearings are described in detail within this disclosure, active magnetic radial bearings can be used without departing from the scope of this disclosure. In some implementations, fluid film radial bearings or anti-friction bearings can also be used.

In some instances, the downhole-type electric machine 100 of FIGS. 1A-2 can include both a motor and generator section. In such an instance, the electric machine 100 includes a generator structure that locally generates power in a downhole environment to provide power to a downhole-type tool. For example, a generator structure incorporated into a downhole-type system with a downhole power unit (e.g., electric motor) can generate power from rotation of a rotor of the downhole power unit. This local power generator can be used to power various downhole electronic components.

Figure 3A:
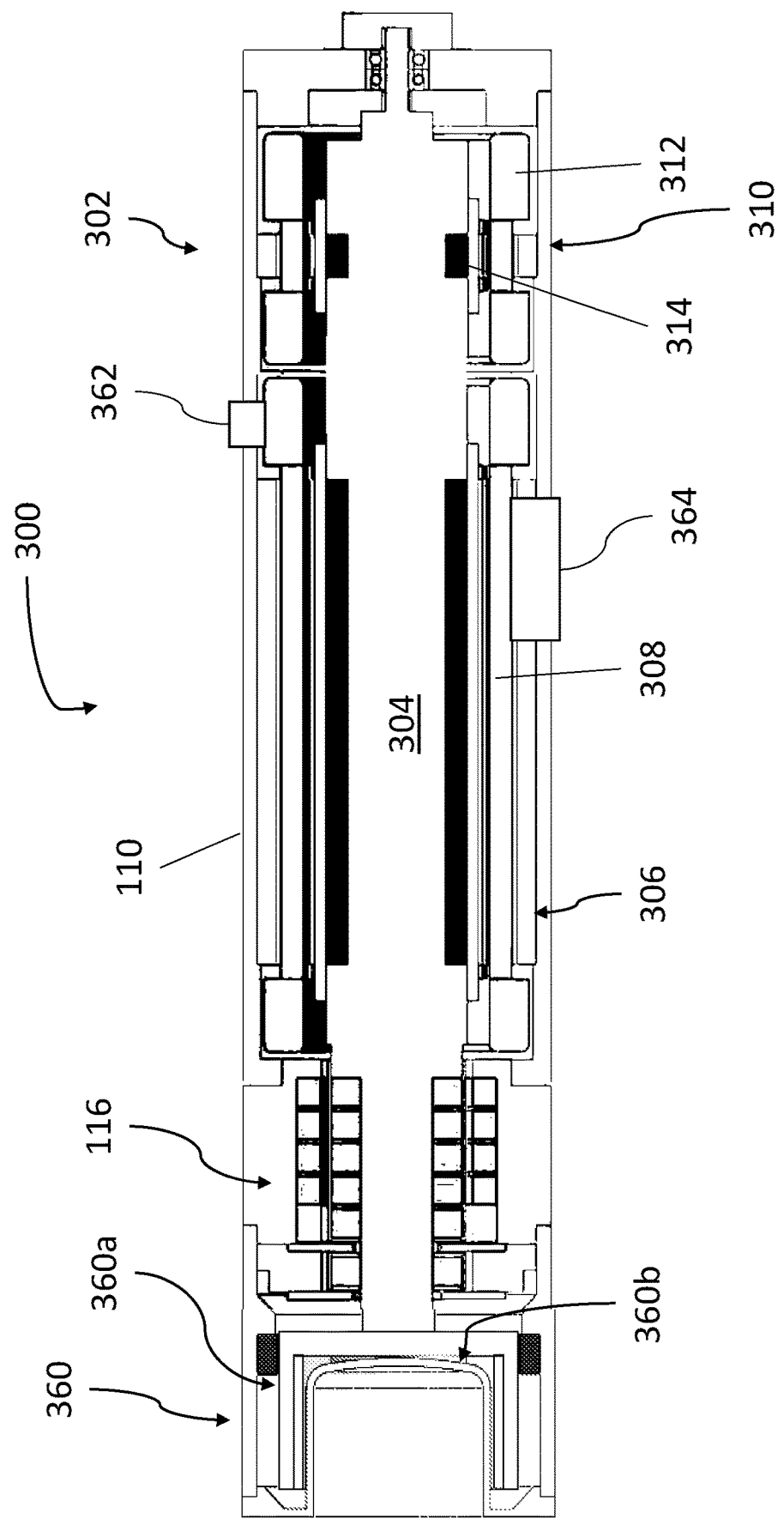
FIGS. 3A-3B are side half cross-sectional views of an example downhole-type electric machine.

For example, FIG. 3A is a schematic side half cross-sectional view of an example electric motor 300. The example electric motor 300 is similar to and can be used in the electric machine 100 of FIGS. 1A-2, except the example electric motor 300 includes a generator assembly 302. The motor rotor section 304 includes a permanent magnet rotor that is axially levitated and supported, for example, by a thrust bearing (e.g., thrust bearing 118). The electric stator 306 surrounds the permanent magnetic rotor 304 along a first length of the permanent magnet rotor 304, and includes the electric coils 308. The generator assembly 302 includes a generator stator 310 that surrounds a second length of the permanent magnet rotor 304 (e.g., a substantial remaining length of the rotor 304), and includes generator coils 312. In the example electric motor 300 of FIG. 3A, the second length of the permanent magnet rotor 304 includes one or more permanent magnets 314 (one shown, though other types of generators are possible, such as induction type) (e.g., separate from or integral with the permanent magnet of the first length). As the electric coils 308 of the electric stator 306 are energized (e.g., from a Variable Speed Drive), the electric stator 306 drives the motor rotor 304 to rotate. As the motor rotor 304 rotates, the generator coils 312 generate current and the generator assembly 302 can act as a local downhole power generator. The generator assembly 302, and particularly the generator coils 312, can connect to one or more downhole-type tools, such as downhole sensors, controls, or other electronics. In some implementations, the generator assembly 302 connects to one or more rectifiers and/or voltage regulators (e.g., boost chopper, buck-boost converter, buck converter, and/or other) to provide a controlled form of power (e.g., constant voltage output) to the one or more downhole-type tools and/or internal electronics.

In some implementations, a barrier (not shown) separates the coils 312 of the generator stator assembly and the coils of the electric stator 308 of the motor 300 that drives the motor rotor 304. The barrier can include a disc-shaped structure that physically separates the generator stator assembly 302 and the electric stator 306. The barrier can act as an electrical insulator between the coils 312 of the generator stator assembly 302 and the coils 308 of the electric stator 306, for example, to isolate electrical operation of the generator stator assembly 310 and the electric stator 306 and/or to prevent or reduce electric interference between the generator stator 310 and the electric stator 306.

In some implementations, electrical components in the motor 300, such as electric stator 306 and the generator stator 310 and their respective electrical coils 308 and 312 shown in FIG. 3A, are fluidically isolated from the outside environment surrounding the motor 300. As described earlier, the motor 300 can operate under flooded or fully sealed conditions. Such isolation protects the electrical components from corrosion and other degradation mechanisms that can occur due to exposure to the downhole environment. In some implementations, the electric motor 300 and generator assembly 302 are isolated from the environment via an isolation barrier, where no components of the electric motor 300 or generator assembly 302 are exposed to the downhole environment. In such an instance, a magnetic coupling 360 can be used. As illustrated, the magnetic coupling 360 is a radial-gap-type coupling with an outer barrel 360a being coupled to the rotor 304 and an inner barrel 360b is coupled to a driven device, such as fluid end 108. While a radial-gap-type magnetic coupling is illustrated in this implementation, an axial gap type coupling, such as magnetic coupling 107, can be used with similar effects.

FIG. 3A shows the generator assembly 302 as a radial generator, for example, surrounding the rotor extending along a longitudinal centerline axis. In some implementations, the generator assembly 302 includes an axial generator, such as an axial gap generator, that provides an output power to the at least one downhole-type tools.

Figure 3B:
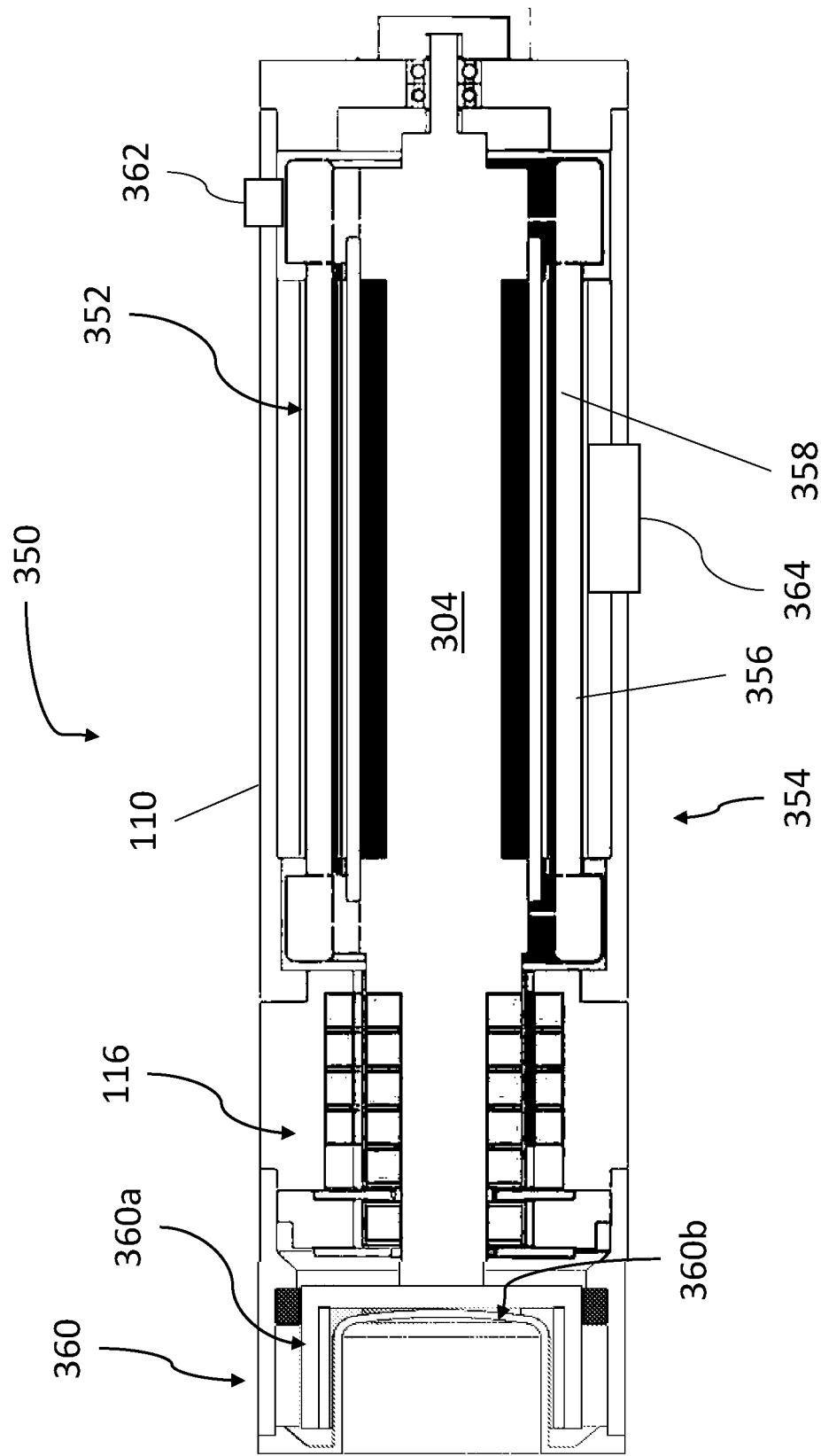

In the example electric motor 300 of FIG. 3A, the electric stator 306 and the generator stator 310 share a common rotor, but are positioned surrounding different length sections of the same rotor. In some instances, a generator assembly can be integral to the electric stator to pull power from the electric motor. For example, FIG. 3B is a schematic side half cross-sectional view of an example electric motor 350. The example electric motor 350 is similar to the example electric motor 300 of FIG. 3A, except the example electric motor 350 excludes the isolated generator assembly 302 and includes an integral generator 352 in the electric stator 354. The integral generator 352 can include a separate winding 358 in the set of stator windings of the electric stator 356, where the separate winding 358 is brought out of the electric stator 354 separately, and is used for taking power from the power supply to the electric stator 354. The separate winding 358 can be located in the same slots as the stator windings for the electric stator 354 that drives the motor rotor 304, or can be located in separate slots in the electric stator 354 designated for only the separate winding 358 of the integral generator 352. For example, the electric stator 356 can include a three phase winding for the motor and a three phase winding for the integral generator 352, where the turns for each winding can depend on operating requirements of the motor 350, generator 352, or both. However, the number of windings for the generator assembly 352, the electric stator 354, or both, can be vary. As described previously, the housing 110 isolates the electric machine and can be flooded with an incompressible fluid. The housing 110 has an outer, circumferential, and continuous wall that. In some implementations, the outer, circumferential wall of the housing 110 defines an annular flow passage with an inner wall of a wellbore 402 (FIG. 4) for flow of well fluid. In some implementations, a seal 362 (FIG. 3A) prevents ingress of the well fluid into the incompressible fluid within the housing 110.

In some implementations, in response to receiving the flow of well fluid, pressure is transmitted through the seal 362 (FIG. 3A) to equalize pressure between the incompressible fluid and the well fluid. The seal 362 can include a flexible membrane that is movable by the well fluid. The seal 362 can move and/or deform and apply pressure on the incompressible fluid, such that the pressures of the incompressible fluid and the well fluid equalize. The seal 362 can be disposed in a wall of the housing 110 that is orthogonal to a central axis of the housing 110. The seal 362 can be disposed in a circumferential wall of the housing 110. Alternatively or in addition, a separate diaphragm 364, piston, or bellows can be used for pressure equalization. In some implementations, regardless of how the pressure is equalized, a bias can be used to ensure that the pressure within the housing 110 (FIG. 1) is lower than that of the wellbore environment.

The separate winding 358 of the integral generator 352 can connect to one or more downhole-type tools, such as downhole sensors, controls or other electronic systems. Similar to the separate generator assembly 302 of FIG. 3A, in some implementations, the integral generator 352 of FIG. 3B connects to one or more rectifiers and/or voltage regulators (e.g., boost chopper, buck-boost converter, buck converter, and/or other) to provide a controlled form of power (e.g., constant voltage output) to the one or more downhole-type systems.

Figure 4:
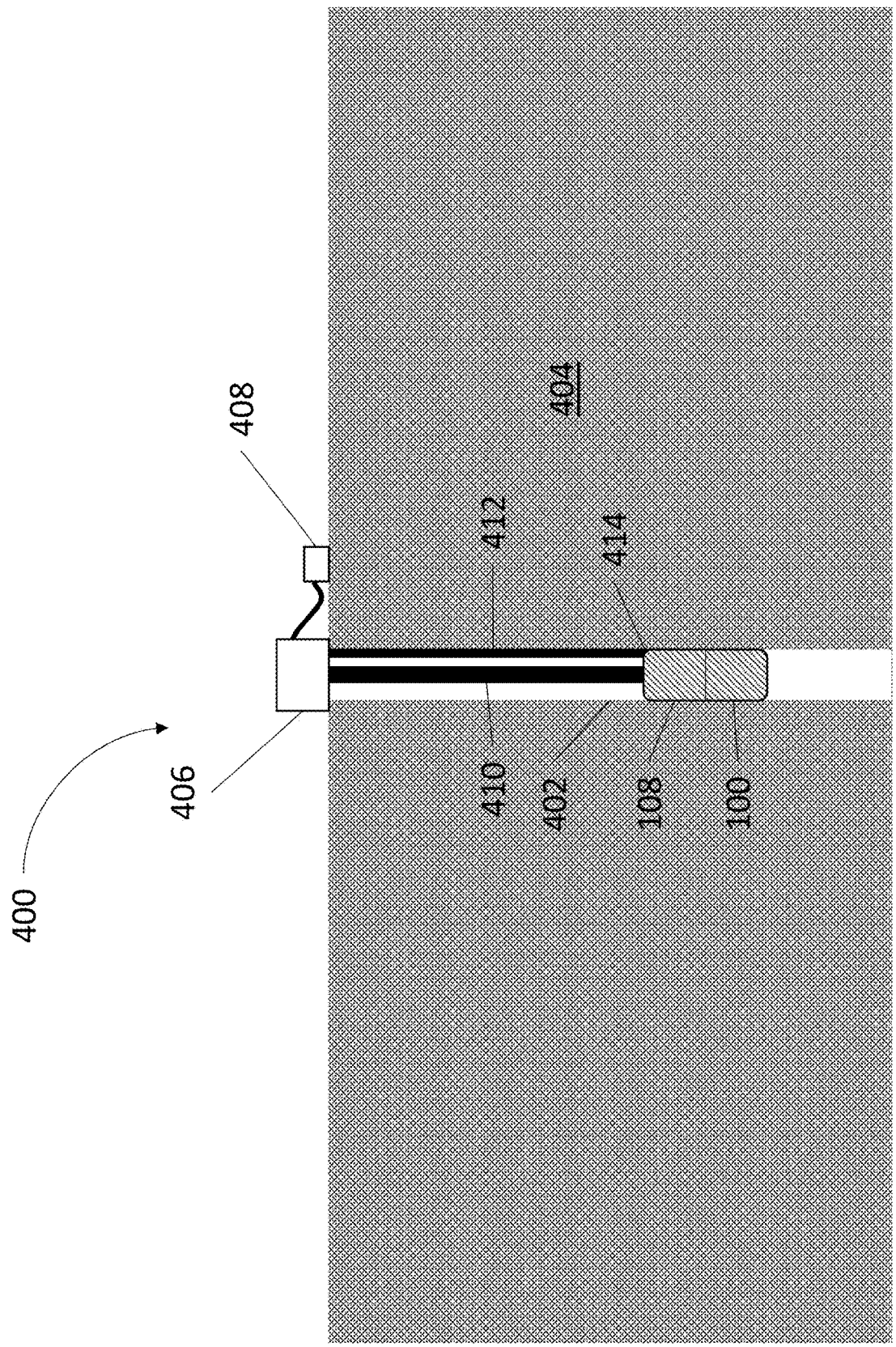
FIG. 4 is a cross-sectional view of a well system installed within a wellbore.

FIG. 4 is a cross-sectional view an example well system 400. The well system 400 includes the high-speed downhole type electric machine 100 and the fluid end 108 positioned within a wellbore 402. The wellbore 402 is formed within geologic formation 404. The fluid end 108 directs production fluid through production tubing 410 towards a wellhead 406. The production fluid can then be directed to a topside facility for processing. The well system 400 includes a controller 408 configured to exchange an electric current to or from the electric stator 104 (FIG. 1A). In the illustrated implementation, the controller 408 is positioned outside of the wellbore 402. The system 400 includes electrical cables 412 that connect the controller 408 and the electric stator 104. The housing 110 includes penetration points 414 for the electrical cables 412. The penetration points 414 are configured to maintain the environment within the housing. For example, the penetration points 414 can be include elastomers, thermoplastics, or TPEs that are configured to surround any penetrating cables and maintain the internal environment, or the penetration points 414 can be formed in a connector assembly that is housed and sealed independently to isolate the connections and ease interface to cables 412. In some implementations, the penetration points 414 can be located at the bottom of the motor to allow for a multiple pin connector to be used. In some implementations, the penetration points can include the seal 362 previously described. In some implementations, an intermediate liquid interface can be used in addition to the elastomers, thermoplastics, or TPEs. Alternatively or additionally, in some implementations, redundant metal-to-metal deformable interfaces (ferrules, crush rings, etc.) can be used to maintain the environmental seal. In some implementations, glass filling can be used for conductor isolation in the electrical cables 412. Alternatively or additionally, metal-to-metal welding of the conductors within the cables 412 can also be used. In some implementations, an outer shielding of the cable can be welded to the housing to maintain the environmental seal. In some implementations, the controller 408 is configured to control any active magnetic bearings that are included in the high-speed down-hole type electric machine 100 and/or the fluid end 108 positioned within a wellbore 402. While the illustrated implementation shows the controller 408 being positioned outside the wellbore 402, the controller 408 can be integrated downhole with the high-speed down-hole type electric machine 100, in part or in its entirety, in some implementations.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims.

What is claimed is:

1. A downhole-type electric machine comprising:
an electric rotor;
an electric stator surrounding the electric rotor;
a magnetic coupling attached to an end of the electric rotor, the magnetic coupling configured to transmit rotational force to or from a separate rotational device;
a housing surrounding and isolating the electrical rotor, the electric stator, and a portion of the magnetic coupling from a wellbore fluid, the housing flooded with an incompressible fluid, wherein a pressure within the housing is substantially the same or lower than a pressure within a wellbore environment; and
a seal sealing a port against ingress of fluid into the housing, wherein the seal is movable by the wellbore fluid to apply a pressure on the incompressible fluid to equalize pressure between the incompressible fluid and the wellbore fluid.

2. The downhole-type electric machine of claim 1, wherein the fluid in the housing lubricates bearings radially and axially supporting the electric rotor within the electric stator.

3. The downhole-type electric machine of claim 1, wherein the fluid in the housing cools the electric stator and bearings located within the housing.

4. The downhole-type electric machine of claim 1, wherein the electric rotor comprises a permanent magnet rotor.

5. The downhole-type electric machine of claim 1, wherein the magnetic coupling comprises a radial gap type coupling or an axial gap type coupling.

6. The downhole-type electric machine of claim 1, further comprising a magnetic or mechanical radial bearing configured to radially support the electric rotor within the electric stator.

7. The downhole-type electric machine of claim 6, wherein the magnetic radial bearing is a passive magnetic radial bearing.

8. The downhole-type electric machine of claim 6, wherein the magnetic thrust-bearing comprises an active magnetic thrust-bearing.

9. The downhole-type electric machine of claim 1, further comprising a magnetic or mechanical thrust-bearing configured to axially support the electric rotor within the electric stator.

10. A method comprising:
in the electric machine of claim 1, imparting a rotational force to or from the electric rotor rotating, within the housing, within the electric machine via the magnetic coupling located at the end of the electric rotor.

11. The method of claim 10, further comprising:
lubricating bearings by the fluid; and
cooling the electric machine by the fluid.

12. The method of claim 10, further comprising actively maintaining an axial position of the rotor within the electric stator with a magnetic thrust-bearing.

13. The method of claim 10, further comprising actively maintaining a radial position of the rotor within the electric stator with a magnetic radial bearing.

14. The method of claim 10, further comprising maintaining a radial position of the rotor within the electric stator with a mechanical radial bearing.

15. The method of claim 10, further comprising maintaining an axial and radial position of the rotor within the electric stator with a mechanical ball bearing.

16. The method of claim 10, wherein the rotor comprises a permanent magnet rotor.

17. The method of claim 10, wherein the housing is constructed of a non-magnetic metal alloy.

18. The method of claim 10, wherein the housing is constructed of a non-magnetic, non-electrically conductive material.

19. A downhole-type electric machine system comprising:
an electric rotor configured to rotate or be rotated by a separate rotational device;
an electric stator configured to surround the electric rotor;
a magnetic coupling configured to transmit rotational force to or from the separate rotational device;
a housing configured to fluidically isolate the electrical rotor, the electric stator, and a portion of the magnetic coupling from a wellbore fluid, a pressure within the housing being lower than or substantially equivalent to a pressure within a wellbore environment;
a seal sealing a port against ingress of fluid into the housing, wherein the seal is movable by the wellbore fluid to apply a pressure on the housing to equalize pressure between within the housing and the wellbore fluid;
a dielectric fluid located within the housing; and
a controller configured to exchange an electric current to or from the electric stator.

20. The downhole-type electric machine system of claim 19, wherein the controller is configured to be positioned outside of a wellbore.

21. The downhole-type electric machine system of claim 20, wherein the system further comprises electrical cables connecting the controller and the electric stator, the housing comprising penetration points for the electrical cables, the penetration points configured to maintain the pressure within the housing.

22. The downhole-type electric machine system of claim 21, wherein the penetration points are part of a connector are located at a downhole end of the housing.

23. The downhole-type electric machine system of claim 19, further comprising an active magnetic thrust-bearing configured to axially support the electric rotor within the electric stator.

24. The downhole-type electric machine system of claim 23, wherein the controller is further configured to control the active magnetic bearing.

25. The downhole-type electric machine system of claim 19, further comprising a magnetic radial bearing configured to radially support the electric rotor within the electric stator.

26. The downhole-type electric machine system of claim 25, wherein the magnetic radial bearing comprises an active magnetic radial bearing.

* * * * *